Nov. 30, 1943.    V. H. FRAENCKEL ET AL    2,335,659
LIGHT CONTROLLING DEVICE
Filed Aug. 27, 1940
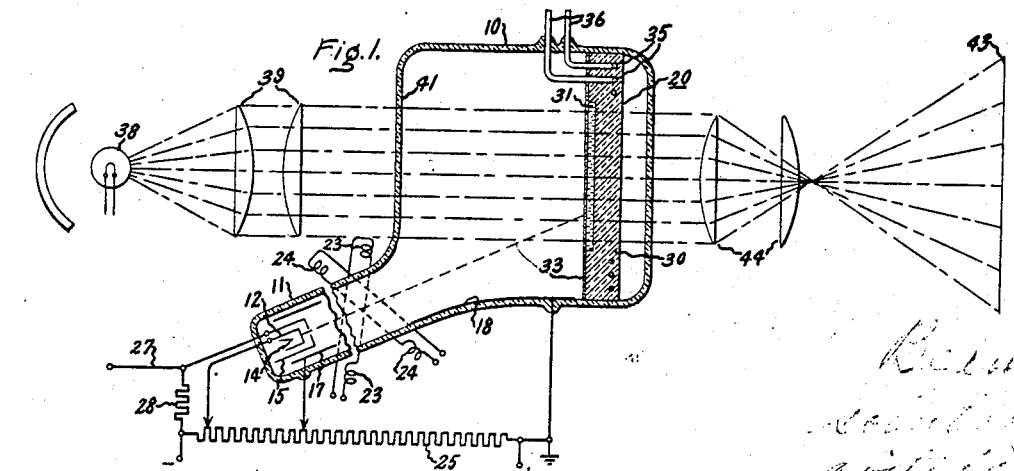
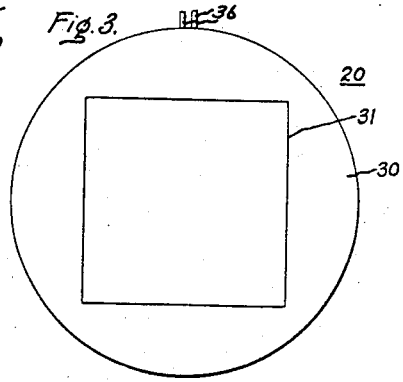
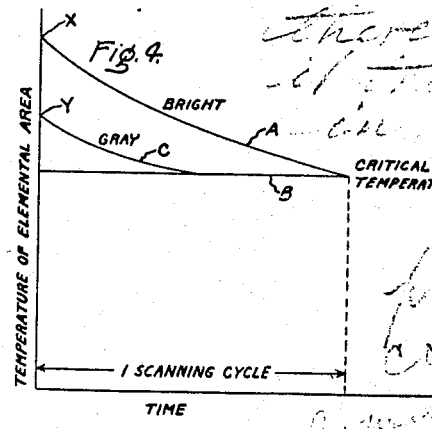
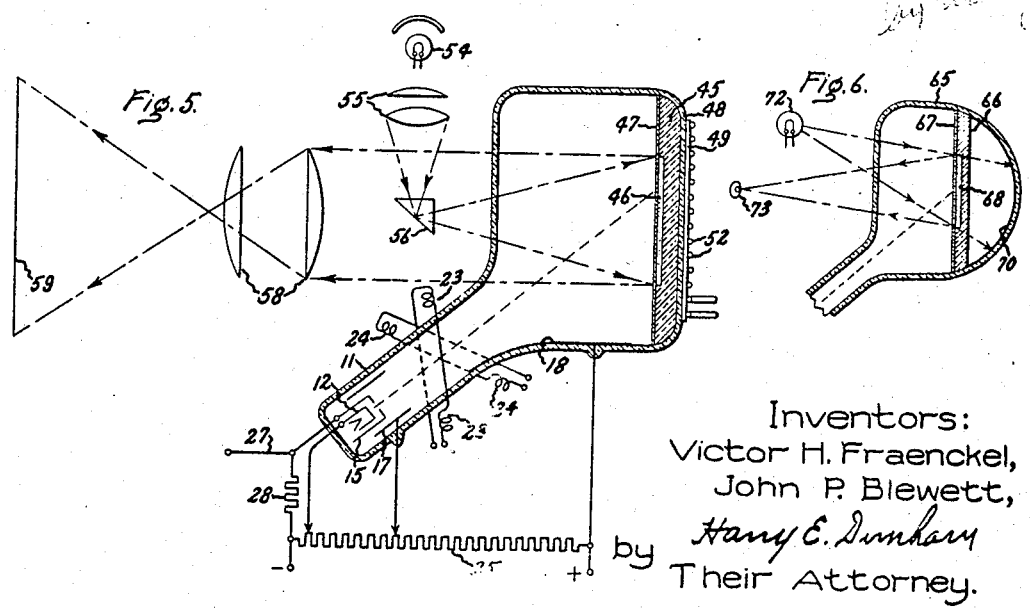
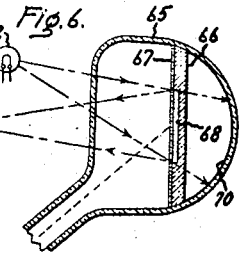
Inventors:
Victor H. Fraenckel,
John P. Blewett,
by Harry E. Dunham
Their Attorney.

Patented Nov. 30, 1943

2,335,659

UNITED STATES PATENT OFFICE 2,335,659

LIGHT-CONTROLLING DEVICE

Victor H. Fraenckel, Schenectady, and John P. Blewett, Scotia, N. Y., assignors to General Electric Company, a corporation of New York Application August 27, 1940, Serial No. 354,390

11 Claims. (Cl. 178—7.5)

The present invention relates to light-controlling devices and has as its principal object the provision of improved means for controlling the transmission or reflection of light in response to a rapidly varying control factor. An important application of the invention is in connection with television reception where it may be used in the production of images of greater intensity or brightness than can be obtained with previously available image-reproducing means.

The invention makes use of certain phenomena noted in the behavior of substance mixtures and depends upon the possession by such mixtures of a critical temperature of mutual solution of the admixed substances. In this connection, it has been observed that many substances, especially when in liquid form, are mutually soluble above some critical temperature which is a function of the particular substances involved and are substantially insoluble below such temperature. Moreover, the optical properties of a substance mixture which is at such temperature as to permit the mutual solution of its constituents are ordinarily quite different from those which obtain when the mixture is in a range of insolubility. In general, a liquid mixture which is below the critical temperature of solution tends to be turbid or light dispersive as a result of the undissolved condition of its components, while the same mixture may appear quite transparent when above the critical range.

In some instances, the critical temperature referred to may be within a range which is impractical to attain, but in numerous other cases this temperature is such as to be reached readily by the employment of relatively small amounts of heating energy. According to the present invention, it is proposed to utilize substance mixtures falling within this latter category in combination with means for controlling the temperature of the mixture in response to an appropriate control factor. In this way, the light-transmission of the mixture may be caused to change in accordance with its variations in temperature so that the effects of a variable light valve is obtained.

In the application of the invention to television, the temperature controlling means may be a beam of electrons which is varied in intensity in accordance with the changes in a received image-bearing signal. By using such a beam in connection with a substance mixture which presents a relatively extended surface and by causing the beam to scan sequentially the various elemental areas of the surface, the point-by-point variations in transparency of the substance mixture may be made to accomplish image-reproducing effects. Moreover, since the substance mixture, in its intended mode of use, functions as a valve for an independent source of light rather than as a light-generating agency, no limitation other than the capacity of the primary light source exists as to the brightness of the images which may be obtained.

The features desired to be protected herein are pointed out with particularity in the appended claims. The invention itself, together with further objects and advantages thereof may best be understood by reference to the following description taken in connection with the drawing in which Fig. 1 is a schematic view of a cathode-ray tube which embodies an image-reproducing target constructed in accordance with the present invention; Fig. 2 is an enlarged sectional view of the target incorporated in the apparatus of Fig. 1; Fig. 3 is a front elevation of the target; Fig. 4 is a graphical representation useful in explaining the invention, and Figs. 5 and 6 illustrate alternative modes of use of the invention.

Referring particularly to Fig. 1 there is shown a television receiver including a cathode ray tube which is enclosed within an evacuated envelope indicated by the numeral 10. The envelope includes an elongated stem portion 11 which contains an electron emissive cathode 12, heated by means of a filament 14. The cathode is partially enclosed by a centrally apertured control electrode 15 and is further associated with a focusing and accelerating anode 17. In addition to the electrodes just named there is provided a further high voltage electrode in the form of a coating of conducting material applied to a portion of the interior surface of the envelope as indicated at 18. The cathode 12 and the associated electrodes serve to develop, accelerate and focus a beam of electrons toward a target 20 which embodies the present invention and which will be hereinafter described in detail. The focusing of the electron beam may be enhanced by the use of a magnetic focusing coil (not shown), and deflection of the beam in directions transverse to the axis of the envelope shaft portion 11 may be accomplished by appropriately energized deflecting coils indicated diagrammatically at 23 and 24.

Operating potentials are applied to the various electrodes of the cathode ray tube 10 from a suitable source, for example, a voltage divider 25 which is connected across a source of unidirectional potential (not shown). A connection 27 is provided for applying a received television signal to the control grid 15 across a resistor 28. During the operation of the tube the intensity of the electron beam projected toward the target 20 is varied in accordance with the received signal and is thus modulated in response to the different values of light and shade occurring in the image being transmitted.

It is the function of the target 20 to convert the variations in the electron beam projected toward it into a visible reproduction of the image being received. To this end, the target includes a mixture of substances (e. g. liquids) which have a critical temperature of mutual solution preferably slightly above the temperature at which the target is normally maintained in the absence of the electron beam; that is, when the beam is either cut off or is reduced to such low intensity as to be incapable of imparting substantial energy to the portion of the target upon which it impinges. In some cases it is expedient to employ in this connection a liquid mixture having a critical temperature of solution slightly above room temperature. In other cases it may prove more convenient to use a mixture having a critical temperature within a relatively higher range and to maintain the mixture normally at a point close to its critical temperature by the use of separate heating means.

Particular mixtures which are considered to have special utility in this connection include the combination of tri-cresyl phosphate and di-ethylene glycol and the combination of tri-cresyl phosphate and propylene glycol. The particular substances named possess critical temperatures of solution lying within a range from about 58 degrees C. to about 74 degrees C. Other combinations which may be employed include aniline and water; phenol and water; nicotine and water; aqueous potassium carbonate and aqueous ammonia; methyl ethyl ketone and water (each containing a small amount of ethanol); methyl alcohol and cyclohexane; ethyl alcohol and succinonitrile; and triethylamine and water. (The last named combination has the unusual characteristic of displaying mutual solubility only below a critical temperature rather than above such a temperature.)

For each of the substance combinations referred to the critical temperature of solubility varies materially with the proportions employed. In general the proportions used should be those which give the maximum critical temperature, since the temperature sensitivity will be greatest for this condition. In many cases, the maximum critical temperature is realized when the admixed substances are combined in approximately equal molecular proportions, and these proportions will usually prove satisfactory.

For present purposes the liquid mixture employed should be disposed in such fashion that it presents a relatively large area in a plane transverse to the direction of the electron beam. In the arrangement illustrated in Fig. 1 this is accomplished by providing a base member of transparent material 30 (e. g. glass) having therein a shallow recess of substantial area as indicated at 31. This recess is sealed by the application to its open face of a thin diaphragm or plate 33 which is also of transparent character. The diaphragm 33 may be constituted, for example, of a thin sheet of glass or mica which is peripherally sealed to the base member 30. The chamber 31 is completely filled with a liquid mixture having a critical temperature of solution as specified above and preferably having also a low vapor pressure. The average temperature of the liquid mixture is normally maintained at a point below and very close to the critical temperature by temperature-regulating means illustrated as a resistance heater 35 which is embedded in the base member 30. This heater is provided with externally accessible terminals 36 and may be connected to an appropriate voltage source (not shown). The supply of heating energy to the coil 35 may be controlled, for example, by thermostatic means, in order to hold the base member 30 at the desired temperature level.

As a result of the maintenance of the liquid mixture at a temperature below its critical temperature the liquid components of the mixture will ordinarily be in undissolved condition. Under these circumstances the liquids tend to form a suspension of one liquid in the other. Their combination will consequently provide an opaque or light-scattering medium due to differences in the indexes of refraction of the interspersed liquid particles. The light-scattering effect will disappear, however, as soon as the liquids are heated above the critical temperature so that the suspended particles go into mutual solution. Accordingly, a given liquid mixture may be changed from a substantially opaque to a substantially transparent character as its temperature is caused to vary from a relatively low to a relatively high value. Moreover, the transformation may be reversed by permitting the liquids to recool.

The phenomenon discussed above may be used in image-reproduction by causing the surface of the target, specifically the surface of the plate 33 (Fig. 1) to be scanned by the electron beam during periods when the intensity of the beam is being varied in accordance with the received television signal. (The scanning may, of course, be accomplished in the usual way by means of the coils 23 and 24.) It will be understood that as the electron beam traverses the various elemental areas of the target surface it tends to deliver energy to such areas in accordance with the instantaneous intensity of the beam. Such energy is immediately transformed into heat and therefore changes the temperature of the target surface from point to point in accordance with the variations of the beam current. That is to say, when the beam is very weak, there is substantially no heating of the areas on which it impinges, and, on the other hand, when the beam is intense, a sharp temperature rise of the affected portion of the target may be expected to occur. Due to the extreme thinness of the plate 33, temperature changes occurring at its surface are immediately communicated to the liquid mixture contained within the recess 31. Consequently, if the mixture is normally maintained just below the critical temperature of solution of its constituent liquids, the effect of the impinging electron beam at points where the beam is relatively intense is to raise the liquid temperature above the critical value at those points. The transformation of the admixed liquids from a suspension to a solution at the heated points will thus produce localized changes in the transparency of the mixture, the location of such changes being determined by the characteristics of the television signal by which the instantaneous intensity of the electron beam is controlled.

In order that the transparency variations of the liquid mixture contained within the target 20 may be translated into light and shadow effects visible by an observer, the target may be used as a light valve for controlling the transmission of light generated by an independent source. In the present instance such a source is indicated as comprising an incandescent lamp 38, whose light is passed through a collecting lens system 39 and is directed on the surface of the target 20 through the tube wall 41. Differing quantities of the light thus reaching the target are transmitted by the various portions of the target in accordance with the variations in transparency produced from point to point by the scanning beam. Image-reproducing effects are accomplished by projecting the transmitted light on a viewing screen 43 through a lens system 44. The screen will depict interspersed areas of light and shadow which are determined directly by the transparency variations of the target 20 and when are thus indirectly controlled by the television signal.

The intensity of the light source 38 may be as great as desired, and for this reason the screen 43 may be made relatively large without thereby objectionably diminishing the contrast effects obtained in the image produced on the screen. In this respect, the image-reproducing means described in the foregoing is free of the limitations which have characterized picture tubes of the type in which the surface struck by the electron beam is itself the primary light-generating agency.

The operation of a light relay or target of the type referred to above may be more fully understood by reference to the following additional explanation. The transformation of a liquid mixture from its undissolved state to a state of solution occurs very abruptly as the mixture of liquids passes through the critical temperature. Consequently, the change in the mixture from a relatively opaque to a relatively transparent condition occurs with equal abruptness. The effectiveness of a light relay of the type under consideration in producing light and shadow effects depends not so much upon graded variations in the degree of transparency of the liquid mixture employed as upon the relative length of time in which the mixture exists in its transparent and non-transparent states. This may be understood by reference to Fig. 4, in which curve A represents the effect upon a given elemental area of the target 20 (Fig. 1) of the impingement thereon of the electron beam at a time when the intensity of the beam is at a level corresponding to the reception of a very bright image element. It is assumed that at the instant just prior to the impingement of the beam the element under consideration is at a temperature just below the critical temperature (indicated by the line B in Fig. 4). When the beam strikes the element, its heating effect immediately raises the temperature of the element and of the adjacent liquid to the point $x$. Since the beam is in constant motion it is apparent that its effect lasts only momentarily. It is to be expected, therefore, that the heated area of the target will immediately begin to cool as its heat is dissipated by conduction and radiation. The curve A represents the nature of the thermal decay of such an element. The time required for the temperature of the element to return to the critical value (and thus to restore the adjacent liquid to an undissolved condition) is a function of the thermal storage capacity of the system and of the other thermally significant parameters involved. For best operation in the present connection, these parameters should be adjusted (for example, by proper choice of the composition and thickness of the cover plate 33 and of the base member 30) so that the restoration of any given area to the critical temperature level from the highest temperature which that element is expected to attain can be accomplished in a period which corresponds approximately to the length of a scanning cycle. With present day television systems this period may be on the order of one-thirtieth of a second. Under the conditions just specified it will be seen that the particular elemental area of the target to which curve A pertains will be transparent during substantially an entire scanning cycle. Consequently, if the condition of the transmitted image does not change in the interval between successive scanning cycles, the element will be maintained in a continuously transparent condition and will appear to an observer of the screen 43 as a point of brightness.

On the other hand, an elemental target area which is affected by the electron beam at the time when it is of relatively low intensity will be only slightly heated, i. e. to the point $y$ and may, therefore, have a thermal decay characteristic such as is indicated by curve C of Fig. 4. In this case, the time required for the element to return to the critical temperature level is on the order of a fraction of a scanning cycle so that the element is transparent only during a portion of the cycle and is relatively opaque during the remainder of the cycle. Due to the integrating effect of the optical sense, this element will therefore appear to the observer as an element of less brightness than the element to which the curve A pertains. Accordingly, if its brightness is sufficiently low, it may be evaluated by the observer as a gray or nearly black (i. e. unlighted) element. The entire range between white and black may be covered by this means and strong contrast effects may thus be obtained.

An alternative mode of application of the invention is illustrated in Fig. 5. In this figure the electron beam-producing elements are identical with those illustrated in Fig. 1 and have, therefore, been similarly numbered. The beam target comprises a recessed backing member 45 having a liquid-containing recess 46 which is covered with a transparent plate 47. The target is shown as being so positioned that the member 45 abuts against the end wall 48 of the tube. The outer surface of the wall 48 is covered by a reflecting body, for example, a metallic coating, as indicated at 49. This coating should be of sufficient thickness to prevent substantial transmission of light and is in contact with a resistance heater 52 which, when energized, serves to keep the target at a temperature corresponding to the critical temperature of a liquid mixture contained within the recess 46.

In use, the target, or at least the active portion thereof, is flooded uniformly with light derived, for example, from an incandescent lamp 54. The light from the lamp is condensed by means of a lens system 55 and is deflected in the direction of the target by means of a prism 56. The prism is preferably of small dimensions so that it obstructs only a minor proportion of light proceeding from the target. As the target is scanned by the electron beam, the various elements of the target become more or less transparent as in the arrangement previously described. However, in this case the light passing through the transparent portion of the target is not viewed directly, but is reflected from the inner surface of the reflecting coating 49. The light thus reflected is collected by means of an appropriate lens system 58 and is caused to impinge on a viewing screen 59. The result is, of course, similar to that realized in connection with the apparatus of Fig. 1; that is to say, an image determined by the received signal by which the electron beam is modulated is produced upon the screen surface.

A still further modification of the invention is shown in Fig. 6, which represents an image-reproducing tube of the cathode ray type from which the elements of the electron beam source have been omitted for the sake of simplicity. In this case the target, which is represented as being contained within a bulbous chamber 65, comprises a transparent base member 66 and a thin transparent cover plate 67 confining between them a shallow space 68 which contains a mixture of liquids. The portion of the chamber 65 behind the target is provided with light-absorbing means, such as a blackening coating applied to the inner wall of the enclosing envelope as indicated at 70. This coating may comprise, for example, a suspension of colloidal graphite in water. The front surface of the target is illuminated by means of a light source which is shown at 72 and is assumed to be viewed directly by an observer positioned at 73. The active portion of the target is scanned by a modulated electron beam indicated by the dotted line 75.

In this case the elemental areas of the target surface which are rendered transparent by impingement of the electron beam appear to the observer as relatively dark areas due to the fact that the light which reaches them from the source 72 is freely transmitted and is absorbed by the background coating 70. Consequently no reflection of light to the observer occurs at these areas. On the other hand, the areas which are not transparent produce a light-scattering effect (due to the fact that the liquids comprising the target mixture are in the form of a fine suspension) so that at least some light from these is reflected. If the amount of the impinging light is sufficiently great, these dispersive areas may be made to appear as areas of considerable brightness, and contrast effects may be obtained. (One way of increasing this effect is to cause the target to be illuminated from various directions as by the provision of a large number of sources of illumination.) Under suitable conditions and with the transparency of the target controlled by a properly modulated scanning beam, the light reflected from the target may be caused to have an image-conveying aspect as viewed by the observer at 73.

The invention may also be advantageously employed in the production of colored images. This may be done, for example, by the use of a plurality of separate targets or screens in which appropriate coloring agents, such as colored dyes, have been incorporated, either in the liquid mixtures contained in the targets or in the transparent walls enclosing the liquid mixtures. A preferred arrangement comprises the combination of three targets which respectviely contain red, green and blue coloring and which are so arranged that the images produced by the various targets are projected in superimposed relation on a common imaging screen. With this arrangement the point-to-point transparency of each target must be controlled by an associated scanning beam which is variable in accordance with the intensity with which the color associated with the particular target in question manifests itself in the various elements of the image desired to be produced. The superposition of the three resultant images on the common viewing screen will result in the production of a composite image exhibiting the correct values of the three primary colors. Thus, in the case of an image which contains red and green tints but is devoid of blue, the blue target will remain opaque, and only red and green color values will show in the image replica produced on the viewing screen. Correlatively, in the case of an image containing only blue shades, the red and green targets will be maintained in non-translucent condition so that the resultant picture will be exclusively of blue aspect.

The invention is, of course, not limited to use in connection with a television reproducing apparatus. It may be alternatively employed, for example, as a light valve for use in photographically recording sound as in the production of sound tracks for moving pictures. In this use, variable heating of a liquid mixture of the character referred to above may be used to modulate, in accordance with the sound desired to be reproduced, a light beam which is projected through the relay. The heating may be accomplished either by the use of an electron beam impinging on the surface of the relay or by other controllable heating means.

Other means for supporting the liquid mixture than that exemplified in Figs. 1, 5 and 6 may be employed. For example, it may in some cases be preferable to absorb the mixture in a body of transparent porous material such as regenerated silica. With this latter arrangement the pores of the liquid impregnated body may be sealed by the application of an appropriate transparent coating such as a stable varnish. In other cases the liquid mixture may be incorporated directly in the chemical structure of a plastic resin such as allyl phthalate.

It has already been pointed out that there is a very large variety of liquid combinations which exhibit significant changes in transparency as they pass from an undissolved to a dissolved state and that the invention is therefore not limited to particular substances. In the case of a few substance mixtures mutual solubility occurs below rather than above a critical temperature, and in the use of such mixtures in accordance with the present invention, an obvious inversion of procedure must be employed; that is to say, the control factor must be of such character as to reduce its heating effect when transparency of the light valve is desired and to increase the heating when opacity is wanted. It is intended in the appended claims to cover this and all other variations of the invention which fall within the true spirit and scope of the foregoing disclosure.

What we claim as new and desire to secure by Letters Patent of the United States is:

1. As an article of manufacture, a light-controlling device comprising the combination of two substances having a critical temperature of mutual solution and means for controllably varying the temperature of the substances through a range which includes the said critical temperature, thereby to produce significant variations in the optical properties of the combination.

2. As an article of manufacture, a light-controlling device comprising the combination of two substances having a critical temperature of mutual solution, the optical properties of the combination being variable as the temperature of the substances is varied above and below the said critical temperature, and means for controllably varying the temperature of the substances through a range which includes the said critical temperature.

3. As an article of manufacture, a light-controlling device comprising the combination of two substances the mutual solubility of which varies with temperature, the optical properties of the combination being also variable with the degree of mutual solubility of the substances, and means for controllably varying the temperature of the said combination.

4. As an article of manufacture, a light-controlling device comprising the combination of two substances having a critical temperature of mutual solubility, the said combination forming a light dispersive medium at temperatures below the critical value and forming a relatively transparent medium at temperatures above the critical value and means for controllably varying the temperature of the said combination through a range which includes the said critical temperature.

5. A light-controlling device comprising the combination of at least two substances the mutual solubility of which varies with temperature, the degree of transparency of the combination being variable with the degree of solubility of the substances, means for supporting the said combination so that it presents a relatively extensive surface area for the impingement of light, and means for variably controlling the temperature of the combination at localized areas thereof, thereby to control the light transmission at such areas.

6. A light-controlling device comprising the admixture of at least two liquids having a critical temperature of mutual solution, the combination being relatively opaque for temperatures below the critical value and relatively transparent for temperatures above the critical value, means for supporting the liquid mixture in such fashion that it presents an extended surface to impinging light, and means for controllably varying the temperature of selected areas of said surface, thereby to control the light transmission at such areas.

7. In combination, a light-controlling device comprising a mixture of substances having a critical temperature of mutual solution, the said mixture being relatively opaque for temperatures below the critical value and being relatively transparent for temperatures above such value, means for supporting the said mixture so that it presents a relatively extended surface to impinging light, and means for controllably varying the temperature of elemental areas of said surface in accordance with the point-by-point variations of an image desired to be reproduced, the temperature variation being within a range which includes the said critical temperature whereby the resultant transparency variations in the said mixture are in accordance with the variations of the said image.

8. In combination, a light-controlling device comprising a mixture of substances having a critical temperature of mutual solution, the said mixture being relatively opaque for temperatures below the critical value and being relatively transparent for temperatures above such value, means for supporting the said mixture so that it presents a relatively extended surface to impinging light, means for varying the temperature of elemental areas of said surface through a range which includes the said critical temperature of solution of the mixed substances, and means for regulating the action of the last named means at each of the said elemental areas in accordance with the point-by-point variations of an image desired to be reproduced, thereby to effect reproduction of said image as a result of the transparency variations of the said mixture.

9. In combination, a light-controlling device comprising a mixture of substances having a critical temperature of mutual solution, the said mixture being relatively opaque for temperatures below the critical value and being relatively transparent for temperatures above such value, means for supporting the said mixture so that it presents a relatively extended surface to impinging light, means for sequentially modifying the temperatures of elemental areas, the range of temperature modification being inclusive of the said critical temperature of solution of the substances, and means for controlling the instantaneous action of said last-named means in accordance with the point-by-point variations of an image desired to be reproduced, thereby to effect the reproduction of said image as a result of the transparency variations of said mixture produced by said means.

10. In combination, a light-controlling device comprising a mixture of substances having a critical temperature of mutual solution, the said mixture being relatively opaque for temperatures below the critical value and being relatively transparent for temperatures above such value, means for supporting the said mixture so that it presents a relatively extended surface to impinging light, means for producing an electron beam which is operable to scan successively the various elemental areas of said surface, and means for controlling the instantaneous heating effect of said beam in accordance with the point-by-point variations of an image desired to be reproduced, the range of such heating variation being inclusive of the critical temperature of solution of the said substances whereby the resultant transparency variations of the said mixture are in accordance with the variations of the said image.

11. In combination, means defining a transparent enclosure presenting a relatively large wall surface at one side thereof and being of limited dimensions in the direction normal to said surface, a mixture of liquids having a critical temperature of solution within said enclosure and substantially filling the same, said mixture being relatively opaque at temperatures above said critical temperature and being relatively transparent at temperatures below such temperature, means for producing an electron beam which sequentially scans the various elemental areas of the said wall surface, and means for controlling the instantaneous heat-producing effect of said beam in accordance with the point-by-point variations of an image desired to be reproduced, the range of heating variation for each elemental area of the affected wall surface being inclusive of the said critical temperature of solution of the liquid mixture whereby the resultant transparency variations of the mixture are in accordance with the variations of the said image.

VICTOR H. FRAENCKEL.
JOHN P. BLEWETT.